March 24, 1931. M. LARSSON 1,797,726
METHOD OF PRODUCING PHOSPHORIC ACID AND HYDROGEN
Original Filed March 31, 1925
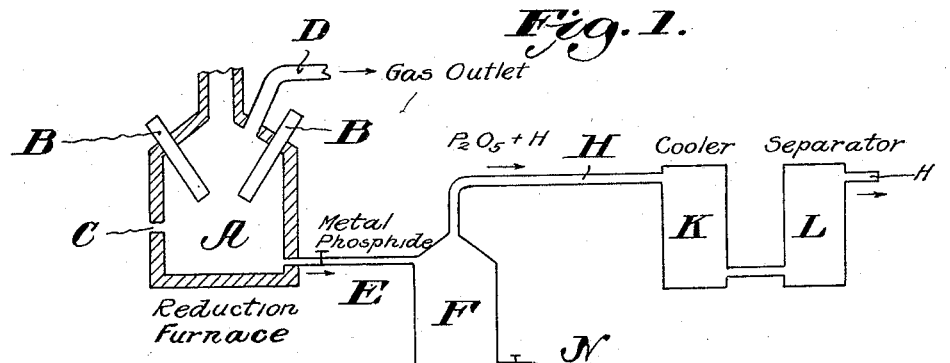
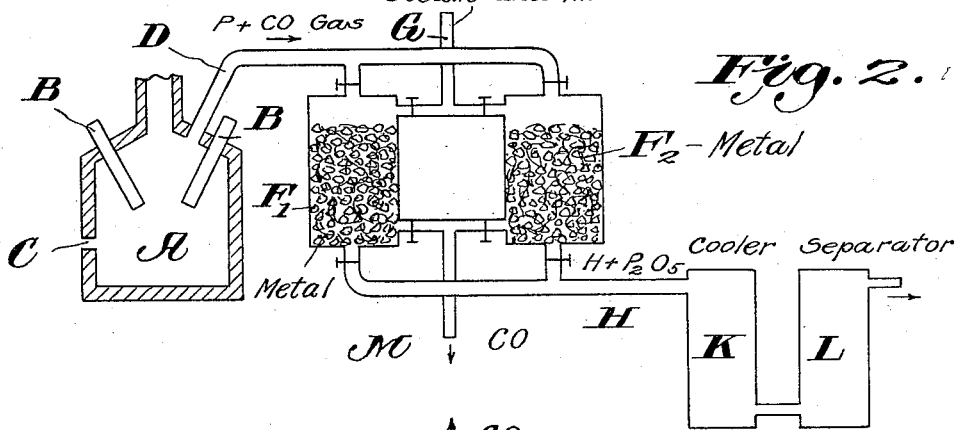
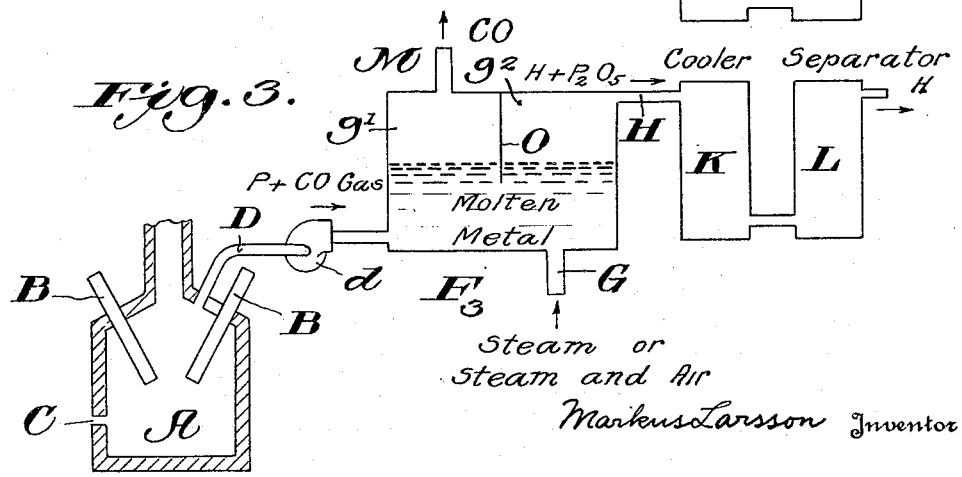

Patented Mar. 24, 1931

1,797,726

UNITED STATES PATENT OFFICE

MARKUS LARSSON, OF BERLIN, GERMANY, ASSIGNOR, BY MESNE ASSIGNMENTS, TO DU PONT AMMONIA CORPORATION, OF WILMINGTON, DELAWARE, A CORPORATION OF DELAWARE

METHOD OF PRODUCING PHOSPHORIC ACID AND HYDROGEN

Original application filed March 31, 1925, Serial No. 19,581. Divided and this application filed January 26, 1929. Serial No. 335,283.

This invention relates to the production of phosphoric acid and hydrogen, the present application being a division of my co-pending application Serial No. 19,581, filed March 31, 1925.

It has already been proposed to produce phosphoric acid through reduction of water by means of elementary phosphorus at a high temperature so that the phosphorus is oxidized to phosphoric acid by the oxygen of the water, setting the hydrogen free. After the hydrogen has been separated from the phosphoric acid it is obtained in a practically pure form. In order to facilitate the reaction between water and phosphorus so that it can take place at a lower temperature and with greater velocity than otherwise and avoiding the formation of phosphine, it has been proposed to use certain metals or their oxides as catalyzers. Generally this reaction is carried out by the use of gaseous phosphorus, which is obtained by reducing phosphatic material by carbon in an electric reduction furnace.

The aim of the present invention is also to produce but in a different way phosphoric acid from phosphorus and water obtaining at the same time free hydrogen as a by-product. The present invention consists chiefly in that a phosphide of a metal reducible by hydrogen is brought to react with water or water vapor at a high temperature. The metallic phosphide can be produced by reducing phosphatic material by carbon in an electric or other suitable reduction furnace adding the metal or oxides of same so that the metallic phosphide is obtained as a molten fluid ($Fe_2P$ melts at 1290° C.) which is tapped off from the furnace and then brought to react with superheated steam, for example, in a Bessemer converter; or the phosphide can also be produced by bringing the gaseous mixture of carbon monoxide and phosphorus obtained by the reduction of phosphatic material in contact with the metal in question at the proper temperature so that the phosphorous is absorbed during the formation of metallic phosphide, which afterwards is reacted upon by means of superheated steam. During the reaction between the metallic phosphide and the steam, the phosphorus of the phosphide is oxidized by means of the oxygen of the steam principally to phosphorus pentoxide at the same time setting hydrogen free. The metal combined with the phosphorus is also set free or changed into oxide, while at the same time a corresponding quantity of hydrogen gas is set free. The metal or oxide can again be used either as an addition in the reduction furnace or for absorption of a new quantity of phosphorus, in which latter case the metal first must be reduced, if it was changed into oxide at the treatment of the phosphide with steam. In that way the process can be carried on without any essential loss of metal.

It is not necessary for the conversion of metallic phosphide into phosphorus pentoxide to use exclusively the oxygen of the water. The invention also covers the case in which part of the oxygen required is added in the form of free oxygen. In this case steam and air may either be mixed in advance in the desired proportions, before being brought together with the metallic phosphide, or else water or steam may be added and then air or vice versa. This modification of the invention may be used either when it is desired to obtain hydrogen gas mixed with a certain percentage of nitrogen, or when required for maintaining the desired reaction temperature.

The carbon monoxide formed by the reduction of the phosphatic material can be used for heating the charge for the production of water vapor and the superheating of same, etc.

The metals that may be used in the present invention are the metals of the eighth group of the periodic system Fe, Ni, Co, Ru, Rh, Pd, Os, Ir and Pt, of the seventh group Mn, of the sixth group Cr, Mo, W and U, and of the first group Cu, Ag and Au. Several of these are, however, mainly of theoretical interest.

In Figs. 1–3 of the attached drawing a schematic view is shown of the apparatus for performing three different ways of carrying out the invention.

In Fig. 1, A indicates an electric reduction furnace which is charged with phosphate rock, carbon, silica and a metal, or a metal oxide, which is reducible by means of hydrogen, for instance, copper in metallic form or an oxidized copper ore. The phosphorous produced from the phosphate rock combines with the metal present into metallic phosphide, which gathers in melted form at the bottom of the furnace under the melted slag formed simultaneously, which slag consists mainly of calcium silicate. The furnace A is provided with electrodes B, slag removing holes C, gas outlet D and a tube E through which the phosphide produced in the furnace may be drawn off periodically into a Bessemer converter F. After the converter has been filled to the required height with melted metallic phosphide, steam or steam mixed with a small quantity of air is blown into same through a tube G whereby the phosphorous in the metallic phosphide is oxidized into phosphorous pentoxide, which volatilizes at the same time as the metal is reduced and the steam decomposed, so that free hydrogen is obtained. The temperature in the converter should be kept so high that the reduced metal will be kept in a liquid condition and so that, at the end of the reaction, it can be drawn off through the tube N. This regulation of the temperature can be accomplished by regulating the temperature of the steam and also by regulating the quantity of air added. The phosphorous pentoxide and hydrogen formed go through a tube H into a cooler or boiler K and from there into a separating system L where the phosphorous pentoxide is separated in some known way, for instance, by electric precipitation or through absorption in water. The hydrogen gas which remains after the separation of the phosphoric anhyride is obtained in a pure form, and can, if mixed with the proper quantity of nitrogen, be directly utilized for the synthetic production of ammonia.

In carrying out the method shown in Fig. 2 the electric reduction furnace A is charged with phosphate rock, silica and carbon without the addition of any metal or metallic oxide, so that there only takes place a reduction of the phosphate rock which produces a gaseous mixture of elementary phosphorus and carbon monoxide, which mixture is passed through a tube D into a chamber $F_1$, filled with pieces of a metal, for instance, copper which is kept at a temperature exceeding 400° centigrade. In this chamber the phosphorous is absorbed by the metal forming a metallic phosphide, while the remaining carbon monoxide escapes through a tube M and is then used for the production of steam, for heating the charge, etc. When the copper in the chamber $F_1$ has absorbed the proper quantity of phosphorous, the flow of gas is changed from the furnace to another absorption chamber $F_2$ and properly superheated water vapor is brought into the chamber $F_1$ through the tube G. In this way the metallic phosphide is reduced to metal at the same time as the water vapor is decomposed. The gaseous reaction products formed consisting of phosphorous pentoxide and hydrogen gas are conducted through the tube H into the cooler or boiler K and the separation system L where the phosphorus pentoxide is condensed and separated in the well known way. By utilizing alternately in the manner described both of the chambers $F_1$ and $F_2$ for the absorption of the phosphorus by means of a metal in solid form and the reduction of the metallic phosphide by means of water vapor, the process may be carried on continuously.

In the method shown in Fig. 3 the electric furnace A is used as shown in Fig. 2 for the reduction of phosphatic rock and the absorption of the gaseous phosphorus coming from the reduction furnace takes place in a chamber $F_3$ containing melted metal, such as for instance, melted copper. Through a partition O, part of which depends from the roof of the chamber into the melted metal, the gas room of the chamber is divided in two parts, $g_1$ and $g_2$, which are not connected with each other. A fan or some other suitable device disposed in the conduit D serves to force the gases coming from the furnace A in a finely divided form under the surface of the metal in the part $g_1$ in order that an effective absorption shall take place. The carbon monoxide leaves part $g_1$ through the tube M and is utilized in a suitable way. When the gases pass the molten metal bath they produce a movement in same so that the phosphide formed is partly transferred to the other part of the chamber ($g_2$). Into this superheated steam is blown through the tube G by which the metallic phosphide is reduced to metal, which through circulation is carried back to part $g$ where it absorbs new quantities of phosphorus while the separated phosphorus pentoxide together with the hydrogen freed by the reduction are brought through the conduit H to the cooler or boiler K and to the separating system L where the phosphorus pentoxide is separated in the usual way.

When the metallic phosphide is produced directly in the reduction furnace it is of course not necessary to treat it by means of steam immediately after it has been drawn off from the reduction furnace. It sometimes may be of advantage to first let it cool off and solidify, granulate it and afterwards treat it by means of steam. When the metallic phosphide is produced outside the reduction furnace by reacting upon a metal by means of the gas coming from a furnace for the reduction of phosphate rock the hydrogen phosphide in the gas also becomes decomposed by the metal.

What I claim is:—

1. The method of producing phosphoric acid and hydrogen gas which comprises reacting upon phosphide of iron by means of hydrogen monoxide at an elevated temperature to oxidize the phosphorus of the phosphide substantially into phosphorus pentoxide and to set free the hydrogen of the hydrogen monoxide.

2. The invention set forth in claim 1 in which free oxygen is added to the hydrogen monoxide.

In testimony whereof, I affix my signature.

MARKUS LARSSON.